United States Patent [19]
Sahlberg

[11] Patent Number: 4,747,748
[45] Date of Patent: May 31, 1988

[54] AIR TURBINE FOR PREVENTING FORMATION OF ICE ON AIR EXPOSED TURBINE PARTS

[75] Inventor: Per-Holger Sahlberg, Helsinki, Finland

[73] Assignee: Imatran Voima Oy, Helsinki, Finland

[21] Appl. No.: 30,837

[22] PCT Filed: Jun. 5, 1986

[86] PCT No.: PCT/FI86/00061
§ 371 Date: Feb. 6, 1987
§ 102(e) Date: Feb. 6, 1987

[87] PCT Pub. No.: WO86/07411
PCT Pub. Date: Dec. 18, 1986

[30] Foreign Application Priority Data
Jun. 7, 1985 [FI] Finland ................................. 852282

[51] Int. Cl.⁴ .............................................. F01B 25/00
[52] U.S. Cl. .................................. 415/47; 415/121 A; 415/168; 415/177; 60/667
[58] Field of Search ........... 415/47, 48, 121 A, 121 R, 415/168, 177; 165/103; 60/664, 667, 650, 682, 653, 666; 62/186, 187; 236/13, 12.13, 12.15

[56] References Cited
U.S. PATENT DOCUMENTS

| | | | |
|---|---|---|---|
| 2,415,673 | 2/1947 | Campbell et al. | 415/148 |
| 2,642,721 | 6/1953 | Mallinson | 60/664 |
| 3,109,285 | 11/1963 | Smith | 415/47 |
| 4,312,381 | 3/1980 | Ratner | 165/103 |

Primary Examiner—Robert E. Garrett
Assistant Examiner—Therese M. Newholm
Attorney, Agent, or Firm—Birch, Stewart, Kolasch & Birch

[57] ABSTRACT

An air turbine is provided and includes a stator having a guide wheel for moist air with guide passages placed between guide blade, a rotor having a runner and inner blade passages placed between the runner blades, and an annular intermediate space between the guide blades of the stator and the runner blades of the rotor. A control unit is provided for controlling the temperature of air to be supplied to the guide wheel. Wet or moist air may expand or cool down to temperatures that are considerably below the freezing point of water without disturbance or prevention of the operation of the turbine by formation of ice on the faces of such turbine parts as are in contact with the air flow passing through the turbine.

5 Claims, 2 Drawing Sheets

AIR TURBINE FOR PREVENTING FORMATION OF ICE ON AIR EXPOSED TURBINE PARTS

BACKGROUND OF THE INVENTION

The present invention is directed to an air turbine including a stator provided with a guide wheel for moist air and having guide passages placed between guide blades, a rotor provided with a runner and having runner blade passages placed between runner blades, an annular intermediate space between the guide blades of the stator and the runner blades of the rotor, and a control unit for controlling the temperature of the air to be supplied to the guide wheel.

Such an air turbine can be used, for example, in heat pumps, refrigeration equipment, air-drying apparatuses, and equivalent devices.

Outdoor air always contains larger or smaller quantities of water in one, two, or three states. Thus, outdoor air always contains water in a gaseous state (as water vapor), but it may additionally contain water in a liquid state (as mist, fog, drizzle, rain), or in a solid state (as snow, hail). Moreover, water may be present simultaneously in gaseous, liquid and solid states (as a so-called mixed cloud).

When wet or moist air expands rapidly in a curved flow duct from a temperature above the freezing point of water to a temperature considerably below this point, the state of the water contained in the air is changed owing to condensation, sublimation, and/or freezing. All of these changes are based on physical phenomena whose mechanisms are very complicated.

The drops of water following along with the flow are accelerated far more slowly than air, because the density of water is considerably higher than that of air. Under these circumstances, in curved ducts, drops of water run along entirely different paths, as compared with particles of air.

The rapid lowering of the temperature resulting from expansion makes all the small drops of water that follow along with the flow subcooled. Subcooled water is, however, a liquid in an unstable state, for which reason, in a cold flow of air, these drops solidify to snow flakes, whose number and size increase rapidly.

If dry flakes of snow or dry particles of ice meet and strike against a cold duct wall whose temperature is below 0° C., no dangerous formation of ice takes place on the duct wall, because the dry snow flakes and the dry particles of ice do not adhere to the cold wall.

If moist flakes of snow, moist particles of ice or small or large subcooled drops of water meet and strike against a warm duct wall whose temperature is higher than 0° C., dangerous formation of ice does not occur either, for snow or ice does not adhere to a warm and moist wall, but glides along it and is blown off.

On the contrary, should subcooled drops of water meet and strike against a cold duct wall whose temperature is lower than 0° C., dangerous formation of ice would occur. In such a case, a strong and hard layer of ice would be formed, and its thickness would increase rapidly. Such formation of ice can take place only within a temperature range of $-10°$ C. to 0° C.

SUMMARY OF THE INVENTION

The object of the present invention is to provide an air turbine in which wet or moist air may expand and cool down to temperatures that are considerably lower than the freezing point of water without disturbing or preventing of the operation of the turbine by formation of ice on such faces of turbine parts as are in contact with the flow of air passing through the turbine. Expansion to temperatures that are considerably below the freezing point of water (0° C.) is energy-economically interesting. With an equal consumption of operating energy, expansion at lower temperatures results in higher heating capacity in a heat pump,
higher cooling output in refrigeration equipment,
larger quantity of air in air-drying apparatuses, etc. as compared with expansion at higher temperatures.

The operational idea of the invention lies therein that the temperature range ($-10°$ C. to 0° C.) risky from the point of view of difficult formation of ice is avoided or eliminated and that subcooled drops of water cannot meet or strike against such duct walls whose temperature is lower than 0° C. Thus, all of the parts of the turbine stator that reach contact with the air flow have a temperature slightly but clearly above the dangerous temperature range. On the contrary, the static temperature of the air in the intermediate space between the stator and the rotor, and so also the wall temperature everywhere in the turbine rotor, will be clearly below that dangerous temperature range. It follows from this that dangerous formation of ice cannot occur, either in the stator or in the rotor.

More specifically, the air turbine in accordance with the invention is characterized in that a control unit is arranged so as to adjust the temperature of the air flowing to the turbine to a temperature of 2 to 10 degrees C., whereat the absolute pressure after the guide wheel is 0.8 to 0.4 times the absolute pressure before the guide wheel. The axial dimension of the intermediate space is at least 30% of the axial dimension of the runner blades. Further, the intermediate space is widened in the radial direction beyond the radial dimension of the passages between runner blades so as to produce whirling that prevents freezing at the inner and outer edges of the intermediate space.

By the present invention, considerable advantages are obtained. Thus, by means of a turbine in accordance with the invention it is possible to reduce the energy consumption to a considerable extent, which again also reduces the amount of overall investments. Moreover, owing to its nature, the operation of the turbine in accordance with the invention is considerably more reliable than prior-art solutions.

BRIEF DESCRIPTION OF THE DRAWING

The invention will be examined in the following in more detail with the aid of the attached drawings.

DETAILED DESCRIPTION OF THE PREFERRED EMBODIMENTS

Figure 1:
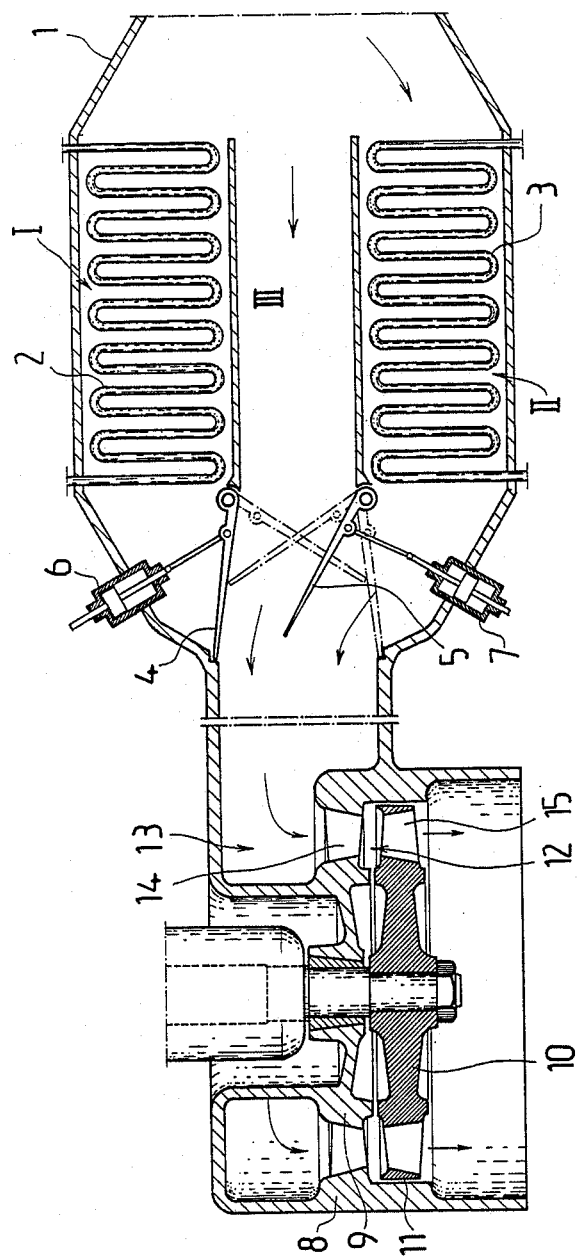
FIG. 1 illustrates the construction of an air turbine in accordance with the invention and of related equipment for controlling the temperature of the wet or moist air flowing into the turbine.

The air turbine subject of the invention consists of a turbine itself as well as of an apparatus by means of which the temperature of the wet or moist air flowing in is controlled. FIG. 1 illustrates an arrangement by means of which it is possible, in principle, to construct the control system. The system 1 for controlling the incoming air is divided into three flow ducts, of which the first one (I) is provided with a heating heat exchanger 2, the second one (II) is provided with a cooling heat exchanger 3, and the third one (III) is a straight flow duct without a heat exchanger. The temperature of the incoming air is controlled by guiding the air flow partly or completely through either one of the flow ducts I, II provided with a heat exchanger 2,3 by regulating the control gates by means of a pneumatic, hydraulic or electric actuating device 6,7.

FIG. 1 shows the construction of the air turbine. The air flowing into the air turbine is passed into the temperature control unit 1, where the air may flow through three ducts I, II, III. The temperature of the air flow is measured after the control unit 1 in the duct 13 passing to the turbine. If the air temperature in the duct 13 is below the desired value, the control gate 4 is opened by the actuating means 6, whereby part of the incoming air flow passes through the heat exchanger 2 that heats the air flow, and thereby the incoming air becomes warm. If the air temperature in the duct 13 is above the desired value, the control gate 5 is opened by the actuating means 7, whereby part of the incoming air flow passes through the heat exchanger 3 that cools the air flow, and thereby the incoming air is cooled. Controlling the temperature of the incoming air takes place by a prior-art technique.

Regarding its construction, the air turbine may be either an axial turbine, a radial turbine, or an intermediate turbine. Regarding its principle of operation, the turbine may be an action turbine or a reaction turbine or a turbine operating with a moderate reaction degree (r=0.05 to 0.45). The turbine shown in FIGS. 1 and 2 as an example is an axial turbine operating with a moderate reaction degree.

The air turbine consists of a stator 8, whose guide wheel 9 is provided with guide blades 14. The other part of the turbine is the rotor 10, whose runner 11 is again provided with runner blades 15. The guide passages 16 formed between the guide blades 14 are strongly curved in order that the relatively large subcooled water drops contained in the air flow passing through the blades 14 should be separated from the air flow and be decomposed when they strike against the guide blades 14 and are partly solidified or freeze or form wet snow. Adherence of ice or wet snow onto the guide blades 14 is prevented so that the wall temperature in the blades is above the freezing point of water, in which case snow and ice do not adhere to the warm and wet wall but glide along the wall face and are blown off along with the air flow.

Between the guide wheel 9 and the runner 11, there is a relatively large intermediate space 12, in order that the distance passed by the air flow from the guide wheel 9 to the runner 11 should be sufficiently long. This is important in view of the operation of the air turbine, because, even though the temperature of the air flow has been lowered to a level considerably below the freezing point of water after the air flow has passed through the guide passages 16, the wet snow and subcooled water drops formed must have time enough to be frozen before they arrive at the runner 11. Since the cooling taking place in the intermediate space results in the generation of dry snow flakes or dry particles of ice, these do not adhere to the walls of the runner 11 even though the prevailing wall temperature is lower than the freezing point of water, because dry particles of ice do not adhere to a cold wall face.

The intermediate space 12 is shaped so that two annular whirls (tori) 18 are formed between the guide wheel 9 and the runner 11 to prevent formation and adherence of ice onto the turbine walls.

Figure 2:
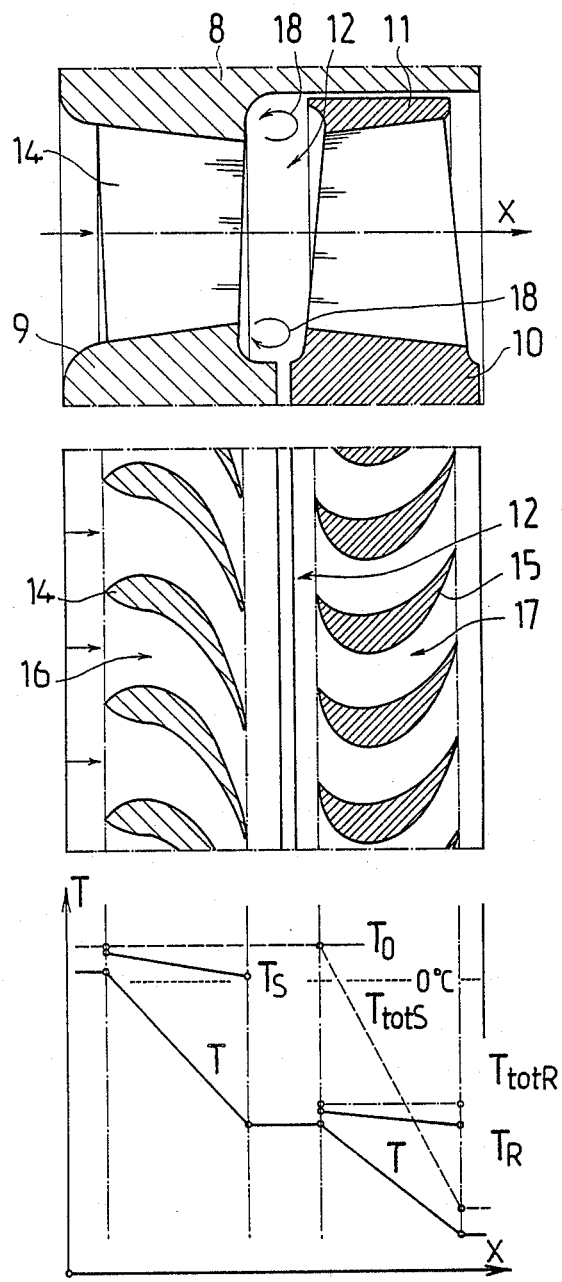
FIG. 2 is a sectional view of the turbine blades and shows a diagram which illustrates the factual temperature of the air as well as the wall temperature of the turbine in the stator and in the rotor.

FIG. 2 shows the factual temperature of the flowing air as well as the wall temperatures in the turbine in the stator 8 and in the rotor 10 at the sectional axis of the guide wheel and of the runner. When the figure is examined, the operational idea of the invention is seen, wherein the aim is to construct an air turbine in which formation of ice is prevented within the risky temperature range of $-10°$ C. to $0°$ C. and in which contact of subcooled water drops with the walls of the turbine is prevented whose temperature is below $0°$ C.

The temperature of incoming moist air, which is in FIG. 2 denoted with the line To, is adjusted by the control unit 1 so that it has a desired value above the freezing point of water. The expansion conditions and the reaction degree in the turbine have been chosen so that the wall temperature Ts of the turbine in all of the parts of the stator that are in contact with the air flow is clearly, but only slightly, above the temperature range involving a risk of freezing. Thus, the wet snow and subcooled water drops formed in the guide passages 16 in the stator on cooling of the moist air flow do not adhere to the guide blades 14 of the stator, and therefore no formation of ice detrimental to the flowing of air and dangerous for the operation of the turbine takes place.

The static temperature of the air in the intermediate space between the guide wheel and the runner, as well as the turbine wall temperature Tr in all parts of the rotor that are in contact with the air flow, are clearly below the range involving risk of freezing, so that any dry particles of ice formed do not partly melt on the wall faces, thereby permitting adhering of ice particles onto the walls.

It should be mentioned that the axial dimension of the intermediate space 12 is at least 30% and preferably about 50%, of the axial dimension of the runner blades 15, and that the temperature of the air before the turbine in the duct 13 is within the range of $2°$ to $10°$ C. so that the absolute pressure after the guide wheel is 0.8 to 0.4 times the absolute pressure before the guide wheel, and the temperature between 12 the guide wheel and the runner is within the range of $-30°$ to $-15°$ C.

Within the scope of the invention, it is also possible to conceive solutions differing from the exemplifying embodiment described above. Thus, the stator does not have to be of the guide-blade type, but it may also be provided with nozzles.

What is claimed is:

1. An air turbine comprising:
    a stator provided with a guide wheel for moist air and with guide passages placed between guide blades;
    a rotor provided with a runner and runner blade passages placed between runner blades;
    an annular intermediate space between the guide blades of the stator and the runner blades of the rotor; and
    a control unit for controlling the temperature of the air to be supplied to the guide wheel;
    said control unit being arranged so as to adjust the temperature of the air flowing to the turbine to a temperature of $2°$ to $10°$ C., whereat the absolute pressure after the guide wheel is 0.8 to 0.4 times the absolute pressure before the guide wheel;

an axial dimension of the intermediate space being at least 30% of the axial dimension of the runner blades, and the intermediate space being widened in the radial direction beyond the radial dimension of the passages between the runner blades so as to produce whirling that prevents freezing at the inner and outer edges of the intermediate space.

2. The air turbine as claimed in claim 1, wherein the axial dimension of the intermediate space is about 50% of the axial dimension of the runner blades.

3. The air turbine as claimed in claim 1, wherein the flow ducts consist of flow passages placed between the guide blades and wherein the guide passages are strongly curved.

4. The air turbine as claimed in claim 1, wherein the control unit includes a heating heat exchanger, a cooling heat exchanger, and guide gates for dividing the overall flow in the desired proportion into component flows passing through either one of the heat exchangers and by-passing the heat exchangers.

5. The air turbine as claimed in claim 4, wherein the control unit is arranged so as to adjust the temperature of the air passing to the turbine by mixing warm air and cold air from the heat exchangers.

* * * * *